United States Patent
Vilsmeier et al.

(10) Patent No.: US 11,340,708 B2
(45) Date of Patent: May 24, 2022

(54) GESTURE CONTROL OF MEDICAL DISPLAYS

(71) Applicant: Brainlab AG, Munich (DE)

(72) Inventors: Stefan Vilsmeier, Munich (DE); Christoffer Hamilton, Aschheim (DE)

(73) Assignee: BRAINLAB AG, Munich (DE)

(*) Notice: Subject to any disclaimer, the term of this patent is extended or adjusted under 35 U.S.C. 154(b) by 0 days.

(21) Appl. No.: 17/046,631

(22) PCT Filed: Jun. 11, 2018

(86) PCT No.: PCT/EP2018/065379
§ 371 (c)(1),
(2) Date: Oct. 9, 2020

(87) PCT Pub. No.: WO2019/238209
PCT Pub. Date: Dec. 19, 2019

(65) Prior Publication Data
US 2021/0117009 A1    Apr. 22, 2021

(51) Int. Cl.
| | | |
|---|---|---|
| *G06F 3/01* | (2006.01) | |
| *G06F 3/0346* | (2013.01) | |
| *G06F 3/14* | (2006.01) | |
| *G06T 19/00* | (2011.01) | |
| *G06V 40/20* | (2022.01) | |

(52) U.S. Cl.
CPC .............. *G06F 3/017* (2013.01); *G06F 3/013* (2013.01); *G06F 3/0346* (2013.01); *G06F 3/1423* (2013.01); *G06T 19/006* (2013.01); *G06V 40/20* (2022.01); *G06T 2200/24* (2013.01)

(58) Field of Classification Search
None
See application file for complete search history.

(56) References Cited

U.S. PATENT DOCUMENTS

| | | | |
|---|---|---|---|
| 2005/0203380 A1 | 9/2005 | Sauer et al. | |
| 2006/0109237 A1* | 5/2006 | Morita | G16H 40/63 345/156 |
| 2011/0026678 A1* | 2/2011 | Bonfiglio | G06F 19/00 378/114 |
| 2012/0257035 A1* | 10/2012 | Larsen | G06F 3/017 348/78 |
| 2012/0272179 A1* | 10/2012 | Stafford | G06F 3/038 715/781 |
| 2013/0342672 A1* | 12/2013 | Gray | G06F 1/1686 348/78 |
| 2014/0139422 A1 | 5/2014 | Mistry et al. | |

(Continued)

FOREIGN PATENT DOCUMENTS

| | | |
|---|---|---|
| EP | 2452649 | 5/2012 |
| WO | 2019238209 | 12/2019 |

OTHER PUBLICATIONS

International Search Report and Written Opinion issued for PCT/EP2018/065379 dated Apr. 3, 2019. 17 Pages.

*Primary Examiner* — Ryan M Gray
(74) *Attorney, Agent, or Firm* — Middleton Reutlinger (57) ABSTRACT

The present invention relates to a computer-implemented medical method, a computer program and a system (1) for controlling a display (6) in a medical environment based a user's (8) viewing direction and gestures performed by the user (8), particularly involving the use of AR-goggles (9).

13 Claims, 4 Drawing Sheets

(56) References Cited

U.S. PATENT DOCUMENTS

| | | | |
|---|---|---|---|
| 2015/0169052 A1* | 6/2015 | Kramer | G06F 3/013 |
| | | | 345/156 |
| 2016/0225192 A1* | 8/2016 | Jones | G06F 3/012 |
| 2016/0255264 A1 | 9/2016 | Russell | |
| 2017/0172696 A1 | 6/2017 | Saget et al. | |
| 2017/0367771 A1 | 12/2017 | Tako et al. | |

* cited by examiner

GESTURE CONTROL OF MEDICAL DISPLAYS

FIELD OF THE INVENTION

The present invention relates to a computer-implemented method for controlling at least one display in a medical environment, a corresponding computer program, a non-transitory program storage medium storing such a program and a computer for executing the program, as well as a medical system comprising an electronic data storage device and the aforementioned computer.

TECHNICAL BACKGROUND

Since the introduction of computer-assisted surgery (CAS), the number of monitors and displays provided in operating and treatment rooms for visually providing data to medical personnel has significantly increased. Thus, it is not unusual that medical personnel are confronted with a large number of displays without actually knowing how to control and interact with these displays. For example, it is often not known which of the provided displays are so-called touch screens and which are not. Consequently, many display applications desired by a surgeon are either indirectly controlled via assisting personnel, or the respective display is left uncontrolled showing a default image. As a result, a sterility-preserving control of provided displays is often cumbersome and time consuming, and the full potential of the CAS-display capabilities remains unused in many cases.

The present invention has the object of providing an easy and direct control of displays in a medical environment, for example in context with CAS.

The present invention can be used for all kinds of medical procedures e.g. in connection with a system for image-guided surgery or radiotherapy such as Curve®, ExacTrac®, or BUZZ®, all of which are products of Brainlab AG.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE INVENTION

The present invention is concerned with a computer-implemented medical method, a computer program and a system for controlling at least one display in a medical environment based on a user's viewing direction and gestures performed by the user, wherein the invention is in particular performed by using an AR-device, specifically, AR-goggles.

The present invention may therefore involve the use of augmented reality (AR) that has become more and more popular in recent years for a large variety of applications which not only include private applications such as computer games, tour- and sightseeing guides, but of course also educational and commercial applications. Concerning visually augmented reality, a general aim is to provide additional information within a person's "natural" visual perception of the real world. In the field of medical applications, visually augmented reality may be used for providing (medical) data to surgeons and other medical personnel.

In the following, a short description of the specific features of the present invention is given which shall not be understood to limit the invention only to the features or a combination of the features described in this section.

The disclosed method encompasses the use of gestures performed by the user in combination with the spatial position (spatial location and/or spatial orientation) of the user's viewing direction so as to control one or more medical displays provided in a medical environment.

GENERAL DESCRIPTION OF THE INVENTION

In this section, a description of the general features of the present invention is given for example by referring to possible embodiments of the invention.

In general, the invention reaches the aforementioned object by providing, in a first aspect, a computer-implemented medical method of controlling at least one display in a medical environment. The method comprises executing, on at least one processor of at least one computer (for example at least one computer being part of the navigation system), the following exemplary steps which are executed by the at least one processor.

In a first step, position data is acquired, which describes the spatial position of a user's viewing direction, particularly the line of sight of the user's eyes with respect to the display.

For this purpose, a medical tracking system (external or contained within the AR-device) can be utilized which may either directly recognize one or more displays, the AR-device and/or the user's eyes, for example by applying shape/pattern recognition methodologies on video images acquired by one or more optical cameras, or by recognizing tracking markers assigned to the object and/or the AR-device, such that the spatial position of the at least one display and at least one of the AR-device and the user's eyes is known in three-dimensional space. In a more specific example, AR-goggles worn by a user comprise one or more sensors that scan the environment in front of the user wearing the AR-goggles. As soon as a monitor or display is detected by the AR-device's sensors (for example, by applying a pattern/shape recognition methodology or by recognizing tracking markers assigned to the one or more displays), the relative spatial position between the one more displays and the AR-device can be calculated. In case the AR-goggles are also provided with a sensor that determines the spatial position of at least one eye of the user with respect to the AR-goggles, it is also possible to calculate a relative spatial position between the one or more displays and the user's eyes. Since both, the AR-device and the user's eyes have a dedicated line of sight, it can be determined from the acquired positional data into which the spatial direction the user is looking.

As soon as it is determined that the user is looking at a specific display or at least to the immediate environment of the display, the system can switch to a control mode such that the user can interact with the respective display. For example, the respective display may be selected by the user by looking at the display and either triggering a selection signal, for example by blinking intentionally, or by looking at the display for a predetermined amount of time.

In a subsequent second step of the inventive method, gesture data is acquired, which describes at least one gesture performed by the user.

In other words, the (selected) display may then be entirely controlled via gestures performed by the user/surgeon. For this purpose it is necessary to "track", i.e. to determine a spatial position of the user's body parts used for performing said gestures. For example, at least one hand and/or at least one finger of the user is spatially tracked by either an external tracking system, or by the sensors of the AR-device, such that the spatial relationship between the display, the at least one gesture performing body part and the user's field of view can be determined. In a specific example, the user is then able to point a finger at a specific location within his field of view, and the system is then able to determine at which actual object in three-dimensional the user is pointing at. This gesture may for example be followed by a selecting gesture (for example a "clicking" gesture resembling the motion of a finger when clicking a button of a conventional computer mouse) such that the system can then select that specific object for a following procedure.

In a subsequent third step of the inventive method, control data is determined based on the position data and the gesture data, describing a user's commands to control the display.

In other words, the present invention calculates at least one control command on the basis of both, the acquired position data and the acquired gesture data. In one specific example, the user may look at a specific display and perform a "click gesture" by "virtually" tapping on a specific object or area shown on that display. Based on the data as to the user's viewing direction and the data as to the performed gesture, the system then sets off the same control command as if a conventional mouse cursor would have been moved onto the displayed object or area, followed by a "left-click" input on a conventional computer mouse.

Even though the inventive method may generally be performed without any AR-device by merely spatially tracking the user's eyes and therefore the user's viewing direction, the user's body parts designated to perform predefined gestures and at least one monitor/display, a specific embodiment of the present invention involves the use of an AR-device as it is described further above, specifically the use of AR-goggles/spectacles. Such AR-devices would allow performing gestures in interaction with a virtual overlay which is projected into the field of view of the user. For example, the AR-device may project into the user's field of view a colored frame around a specific display to indicate that gestures performed by the user will be applied to that specific display.

Further, the user's viewing direction may then either be determined as conforming to the line of sight of the tracked AR-device or to the line of sight of the user's tracked eyes.

In a further embodiment the spatial position of the at least one display, the spatial position of the AR-device and/or the spatial position of the user's eyes are determined in a common (global) co-ordinate system. This may involve the use of a conventional external tracking system as it is known in the prior art. Additionally or alternatively, the spatial position of the at least one display and/or the user's eyes may be determined in a co-ordinate system assigned to the AR-device. This may involve the use of sensors, specifically video cameras of AR-goggles adapted to scan, in a forward direction, the user's field of view in front of the AR-device, and to scan in a backward direction, the spatial position of at least one eye of the user with respect to the AR-device.

As already described further above, the inventive method may be either carried out on the basis of a shape/pattern-recognition to directly identify objects within video-images provided by at least one camera, or by tracking in a conventional manner, tracking markers which are rigidly attached to the respective objects.

For performing the above tasks, the AR-goggles may comprise at least one of the following sensors:
- a video-camera, particularly oriented towards the field of view provided by the AR-device;
- a video-camera oriented towards an eye of the user;
- an acceleration sensor for determining the spatial orientation of the AR-device;
- a depth sensor for determining the distance of the AR-device to an object in the field of view provided by the AR-device.

In case an AR-device, particularly AR-goggles worn by the user is utilized in connection with the inventive method, the information provided by the at least one medical display may be further improved, specifically supplemented for the user by the AR-device. For example, the content/image displayed by the display the user is currently viewing at may be supplemented by content projected into the user's field of view such that the user obtains additional information via the AR-overlay projected into the field of view provided by the AR-device. Specifically, the provided AR-overlay may display virtual control buttons around the frame of the display, via which the image properties such as brightness, contrast and color could be adjusted. Such buttons may however also enable the user to control a computer assigned to the display. For example, "arrow"-buttons may be provided via which the user sift through a series of medical images. In a further example, virtual buttons can be provided which allow the user to zoom in or zoom out of a displayed medical image.

Additionally or alternatively to the supplemented information, the AR-device may also replace content displayed by the display. For example, the user may move a virtual "magnifying-glass" generated by the AR-device over the display in order to obtain a more detailed view on certain areas of interest within a displayed image.

Further, the AR-device may also replace information displayed on the display (e.g. written data in a foreign language) by alternative information (e.g. written information in the native language of the user).

In case the plurality of displays is in use, the user may "virtually" move image content which is initially displayed on a first display, to a second display which is more convenient for the user to look at. In this example, the user may look at the first display, make a "click-and-hold"-gesture with the right index finger, and then draw the selected image to the location of a second display. After the user has made a "release"-gesture, the selected image is now displayed on the second display. More specifically, the selected image may be displayed in the AR-overlay at the virtual location of the right index finger such that the user gets the impression that the image is actually drawn to a new location. As an alternative to the second physical display, the user may also draw the selected image to a virtual location having a uniform color, such as a black wall, which may then serve as a virtual monitor. In a further embodiment, another device may display a spatial location to the user, at which another person is currently looking. For example, assisting personnel can then immediately tell which area of the surgical site a surgeon is currently paying attention to. This may for example apply to a specific location within an image displayed by a monitor, or to an actual anatomical body part of a patient surgery is currently performed on.

A further aspect of the present invention relates to the use of an AR-device, particularly of AR-goggles, for controlling one or more displays in a medical environment. The use of such AR-devices may further involve performing an inventive method as described herein.

In one embodiment, the user can make click gestures with his hands in front of a display. The gesture capture device of the head mounted augmented reality device interprets the gesture and calculates the position of the intended mouse click on the display. This is done by detecting the existence of the display (size, content), the angle of the display compared to the user's location as well as the viewed area behind the mouse click gesture. The click gesture is input to the computer associated to the display by registering a USB HID with the computer.

In a further embodiment, the augmented reality device displays augmented information on or around the computer display. E.g. the augmented reality device displays a colored frame around the monitor to indicate which monitor is currently being controlled.

In a further embodiment, the augmented reality device displays virtual user interface controls around the computer monitor. E.g. the augmented reality device displays virtual buttons on the sides of the computer monitor that contain labels and/or text and can be virtually selected by making gestures in front of the virtual buttons. The menu can display buttons for changing imaging parameters (e.g. brightness, contrast, endoscope lightning, . . . ) or for controlling the software. Further, the menu could be displayed either virtually beside the monitor or virtually above parts of or above the entire monitor.

In a further embodiment, the augmented reality device displays virtual handles attached to the displays. With these handles, it is possible to virtually grab the handles, thereby grabbing the display content, and moving it to another display. Thus, it is possible to change the routing setup in an operating room by grabbing and releasing virtual handles that are connected to display content.

In a further embodiment, the augmented reality device displays a modified subset of any display content. E.g. the augmented reality device could display a virtual magnifying glass. As the user moves the virtual magnifying glass over the display, a virtual content appears in the glasses than contains the magnified display content. In another example, the augmented reality device could display a virtual picture-in-picture image above the normal screen content.

In a further embodiment, the augmented reality device displays true stereoscopic 3D renderings overlaid on top of non-stereoscopic 3D renderings on the displays.

In a further embodiment, the augmented reality device overlays user interface labels on the monitor with labels that are better suited for the user to understand the software. This could be user interface labels translated to the user's language. Alternatively, it could be longer, more descriptive labels.

In a further embodiment, the augmented reality device is extended with integrated eye-tracking, thereby enabling a tracking of the user's gaze direction. The eye tracking is used to place events (e.g. mouse clicks) on the monitor. The wearer of the augmented reality device looks at certain points on the screen and with an interaction (e.g. gesture or voice command) creates a mouse click event.

In a further embodiment with eye tracking with two or more augmented reality devices, the devices are worn by multiple users in an OR. The augmented reality device could be used to overlay on a display the focus of anther user. E.g. an assistant surgeon could see where the chief surgeon is looking on the monitor.

In a second aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first aspect. The invention may alternatively or additionally relate to a (physical, for example electrical, for example technically generated) signal wave, for example a digital signal wave, carrying information which represents the program, for example the aforementioned program, which for example comprises code means which are adapted to perform any or all of the steps of the method according to the first aspect. A computer program stored on a disc is a data file, and when the file is read out and transmitted it becomes a data stream for example in the form of a (physical, for example electrical, for example technically generated) signal. The signal can be implemented as the signal wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program.

In a third aspect, the invention is directed to a non-transitory computer-readable program storage medium on which the program according to the second aspect is stored.

In a fourth aspect, the invention is directed to at least one computer (for example, a computer), comprising at least one processor (for example, a processor) and at least one memory (for example, a memory), wherein the program according to the second aspect is running on the processor or is loaded into the memory, or wherein the at least one computer comprises the computer-readable program storage medium according to the third aspect.

In a fifth aspect, the invention is directed to a medical system, comprising:
  a) at least one computer;
  b) at least one display for displaying medical content in a medical environment; and
  c) a tracking system for controlling the display, wherein the at least one computer is operably coupled to
    a medical tracking system for acquiring, from the medical tracking system, at least the position data and the gesture data, and
    the display for issuing a control signal to the display for controlling the operation of the display on the basis of the position data and the gesture data, particularly wherein the system further comprises
  d) at least one AR-device, specifically wherein the at least one computer is operably coupled to
    the at least one AR-device for acquiring, from the AR-device, at least the position data and the gesture data.

The invention does not involve or in particular comprise or encompass an invasive step which would represent a substantial physical interference with the body requiring professional medical expertise to be carried out and entailing a substantial health risk even when carried out with the required professional care and expertise.

DEFINITIONS

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Image registration is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

The present invention is also directed to a navigation system for computer-assisted surgery. This navigation system preferably comprises the aforementioned computer for processing the data provided in accordance with the computer implemented method as described in any one of the embodiments described herein. The navigation system preferably comprises a detection device for detecting the position of detection points which represent the main points and auxiliary points, in order to generate detection signals and to supply the generated detection signals to the computer, such that the computer can determine the absolute main point data and absolute auxiliary point data on the basis of the detection signals received. A detection point is for example a point on the surface of the anatomical structure which is detected, for example by a pointer. In this way, the absolute point data can be provided to the computer. The navigation system also preferably comprises a user interface for receiving the calculation results from the computer (for example, the position of the main plane, the position of the auxiliary plane and/or the position of the standard plane). The user interface provides the received data to the user as information. Examples of a user interface include a display device such as a monitor, or a loudspeaker. The user interface can use any kind of indication signal (for example a visual signal, an audio signal and/or a vibration signal). One example of a display device is an augmented reality device (also referred to as augmented reality glasses) which can be used as so-called "goggles" for navigating. A specific example of such augmented reality glasses is Google Glass (a trademark of Google, Inc.). An augmented reality device can be used both to input information into the computer of the navigation system by user interaction and to display information outputted by the computer.

The invention also relates to a navigation system for computer-assisted surgery, comprising:
a computer for processing the absolute point data and the relative point data;
a detection device for detecting the position of the main and auxiliary points in order to generate the absolute point data and to supply the absolute point data to the computer;
a data interface for receiving the relative point data and for supplying the relative point data to the computer; and
a user interface for receiving data from the computer in order to provide information to the user, wherein the received data are generated by the computer on the basis of the results of the processing performed by the computer.

A navigation system, such as a surgical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU) and a working memory and advantageously an indicating device for issuing an indication signal (for example, a visual indicating device such as a monitor and/or an audio indicating device such as a loudspeaker and/or a tactile indicating device such as a vibrator) and a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

For example, the atlas data includes information of the anatomical body part. This information is for example at least one of patient-specific, non-patient-specific, indication-specific or non-indication-specific. The atlas data therefore describes for example at least one of a patient-specific, non-patient-specific, indication-specific or non-indication-specific atlas. For example, the atlas data includes movement information indicating a degree of freedom of movement of the anatomical body part with respect to a given reference (e.g. another anatomical body part). For example, the atlas is a multimodal atlas which defines atlas information for a plurality of (i.e. at least two) imaging modalities and contains a mapping between the atlas information in different imaging modalities (for example, a mapping between all of the modalities) so that the atlas can be used for transforming medical image information from its image depiction in a first imaging modality into its image depiction in a second imaging modality which is different from the first imaging modality or to compare (for example, match or register) images of different imaging modality with one another.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia.

The image data thus generated is also termed "medical imaging data". Analytical devices for example are used to generate the image data in apparatus-based imaging methods. The imaging methods are for example used for medical diagnostics, to analyze the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumor represents an example of a change in an anatomical structure. If the tumor grows, it may then be said to represent an expanded anatomical structure. This expanded anatomical structure may not be detectable; for example, only a part of the expanded anatomical structure may be detectable. Primary/high-grade brain tumors are for example usually visible on MRI scans when contrast agents are used to infiltrate the tumor. MRI scans represent an example of an imaging method. In the case of MRI scans of such brain tumors, the signal enhancement in the MRI images (due to the contrast agents infiltrating the tumor) is considered to represent the solid tumor mass. Thus, the tumor is detectable and for example discernible in the image generated by the imaging method. In addition to these tumors, referred to as "enhancing" tumors, it is thought that approximately 10% of brain tumors are not discernible on a scan and are for example not visible to a user looking at the images generated by the imaging method.

BRIEF DESCRIPTION OF THE DRAWINGS

In the following, the invention is described with reference to the appended figures which give background explanations and represent specific embodiments of the invention. The scope of the invention is however not limited to the specific features disclosed in the context of the figures, wherein.

DESCRIPTION OF EMBODIMENTS

Figure 1:
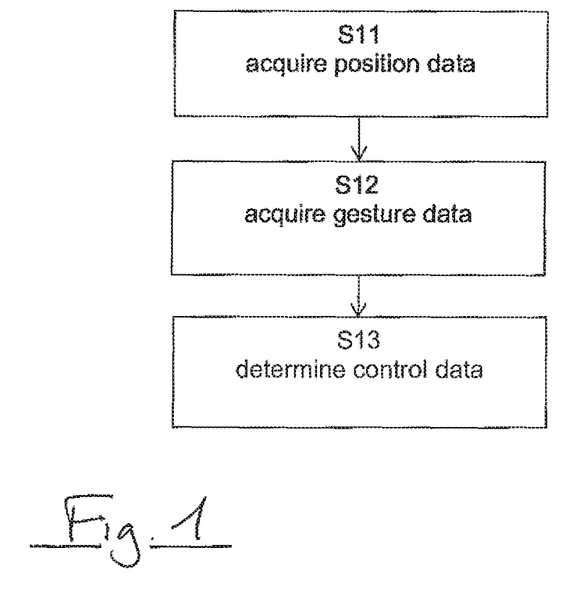
FIG. 1 illustrates the basic method steps according to the present invention.

FIG. 1 illustrates the basic steps of the method according to the first aspect of the present invention, in which step S11 encompasses acquiring position data which describes the spatial position of a user's viewing direction, step S12 encompasses acquiring gesture data which describes at least one gesture performed by the user, and the final step S13 encompasses determining control data on the basis of the acquired position data and the acquired gesture data, wherein the control data describes a user's command to control at least one of the displays.

Figure 2:
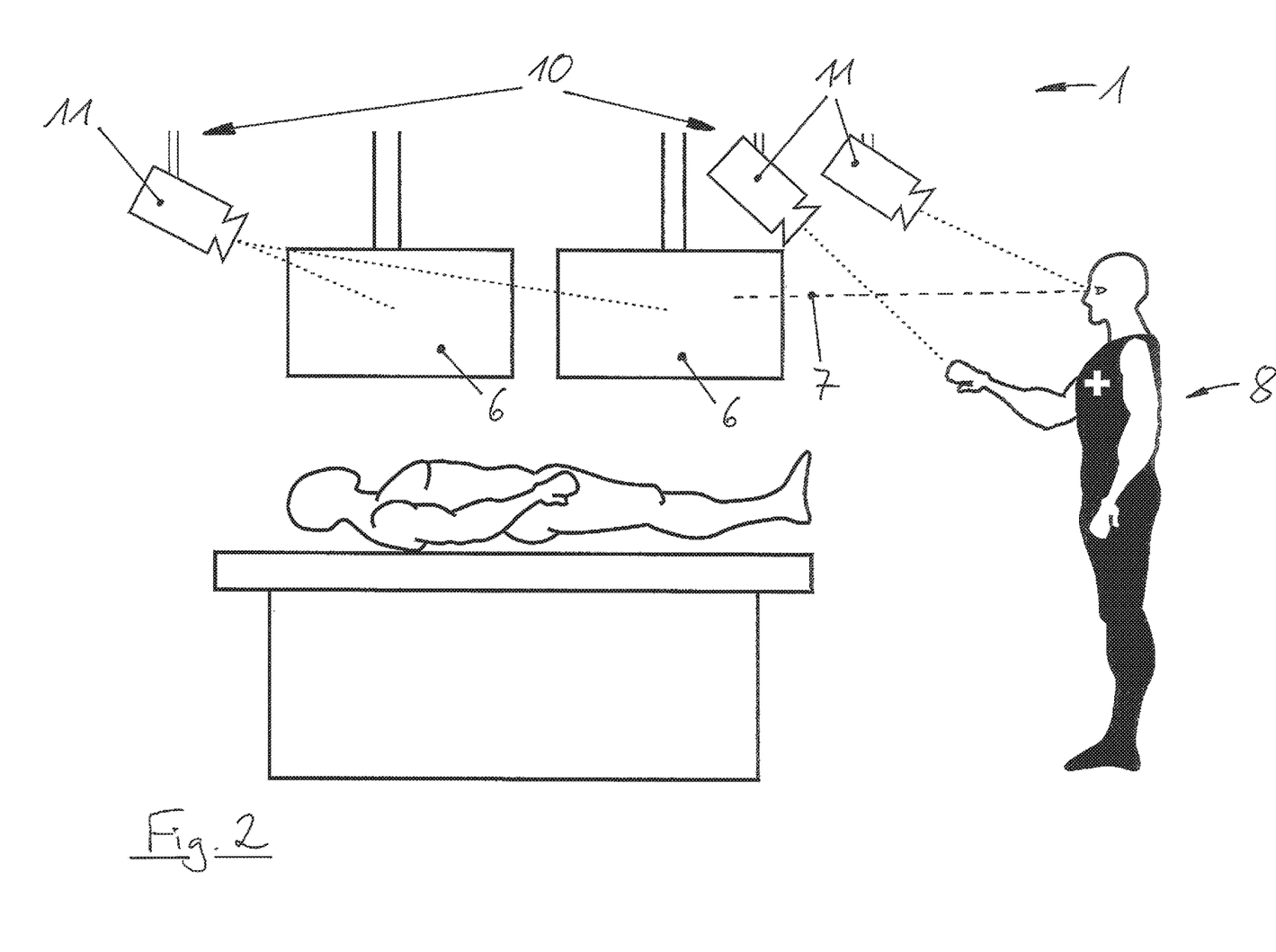
FIG. 2 shows a first embodiment of a medical system according to the present invention.

FIG. 2 illustrates how the present invention may be applied in a medical environment. A medical tracking system 10 determines via video cameras 11 the spatial positions (spatial locations and/or spatial orientations) of the eyes of the user 8, b) the hands and the fingers of the user 8 and c) the displays 6. Based on the acquired position data, a computer 2 operatively connected to the tracking system 10 can calculate to which spatial location the user 8 is currently looking, and at which virtual location the user 8 is performing a gesture within his field of view. In the example shown in FIG. 2, computer 2 calculates that the user's viewing direction 7 is aiming at the right one of both displays 6, such that subsequent gestures performed by the user will apply to the content displayed on the right monitor 6. For example, the user may turn the right monitor 6 on and off by virtually tapping (from a distance) onto the screen surface of the monitor 6.

Figure 3:
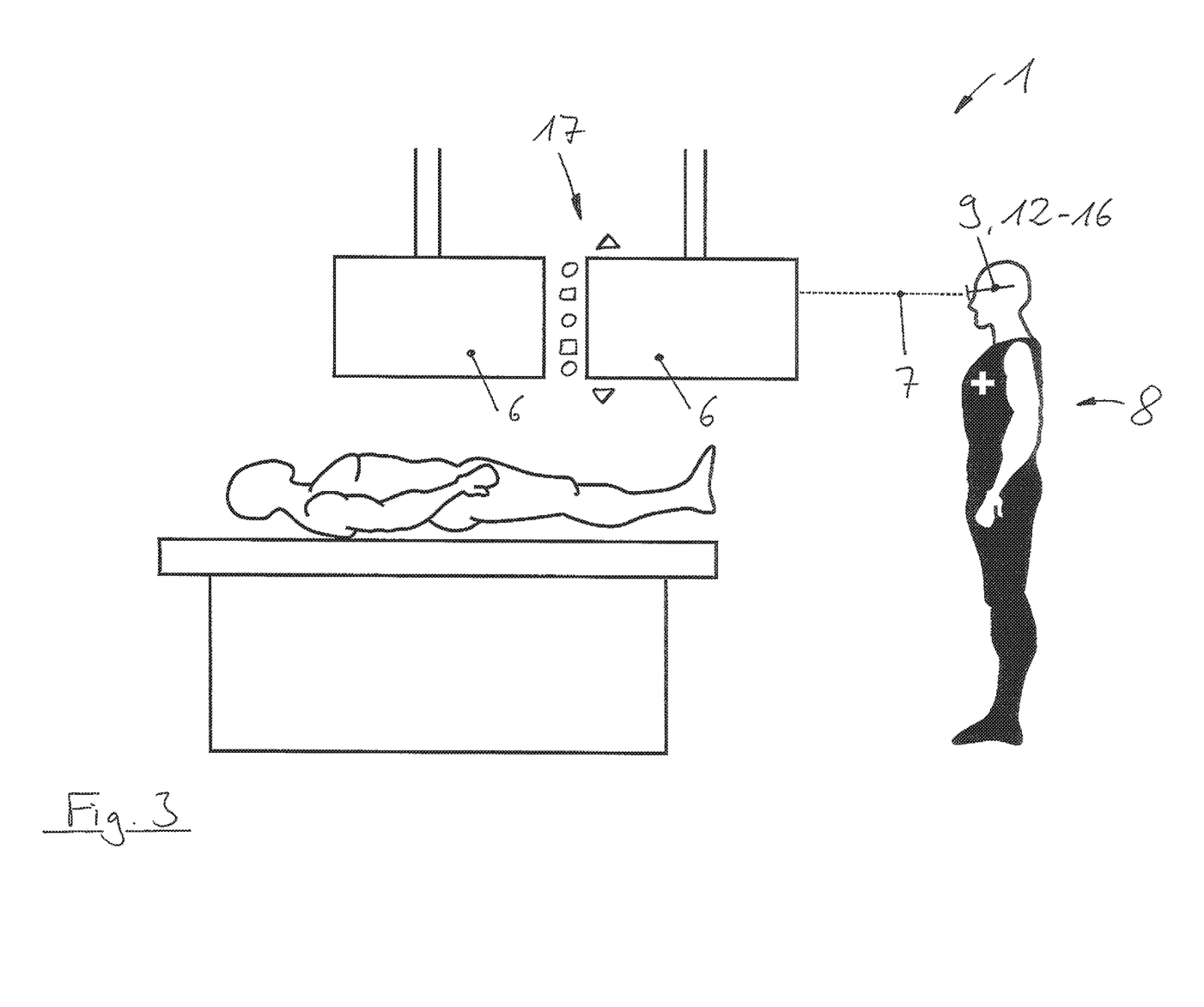
FIG. 3 shows a second embodiment of a medical system according to the present invention.

FIG. 3 shows a second embodiment of the inventive system which differs from the first system as shown in FIG. 2 in that the "external" tracking system 10 is replaced by a plurality of sensors 12-16 provided by AR-goggles 9 that are worn by the user 8, which are to determine the relative spatial position of the AR-goggles 9 (or in the alternative of the eyes of the user 8) with respect to the displays 6 and to the hands and fingers used by the user 8 to perform predetermined gestures for controlling the displays 6. Since the AR-goggles 9 are capable of providing a virtual AR-overlay within the user's field of view, it is possible to augment the user's field of view by a virtual control interface 17 via which the user can control the content displayed by the monitor 6. In the specific example shown in FIG. 3, the sensors 12-16 determine that the line of sight 7 of the AR-goggles 9 is directed towards the right display 6, such that the virtual control interface 17 is displayed to the user around the frame of the right display 6. By pointing at one of the buttons of the control interface 17 with an index finger or by virtually tapping onto that button, the user 8 can set off a respective command to control the right monitor 6.

Figure 4:
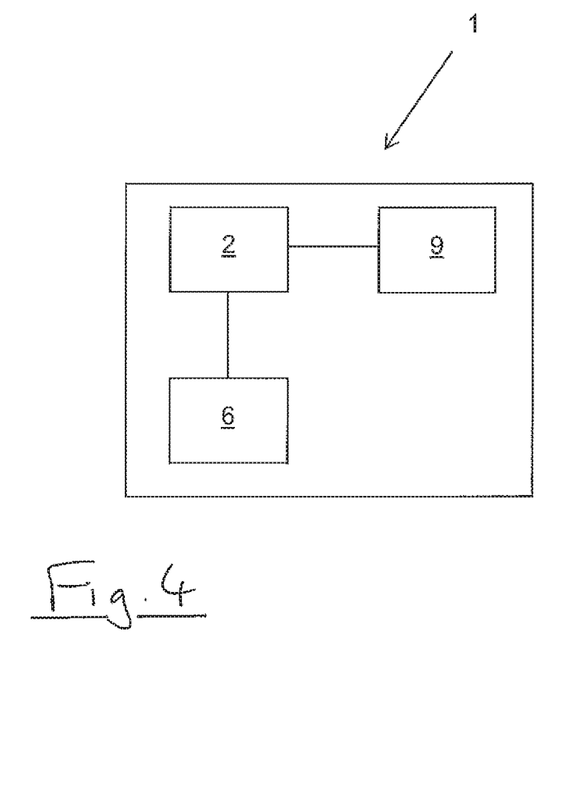
FIG. 4 is a schematic illustration of the system according to the fifth aspect.

FIG. 4 is a schematic illustration of the medical system 1 according to the fifth aspect. The system is in its entirety identified by reference sign 1 and comprises a computer 2 operatively connected to at least one display 6 for displaying medical data and to an AR-device 9 (such as AR-goggles/spectacles). The components of the medical system 1 have the functionalities and properties explained above with regard to the fifth aspect of this disclosure.

The invention claimed is:

1. A computer-implemented method of controlling a display in a medical environment, the method comprising the following steps:
  position data is acquired, describing a line of sight of an AR-device and/or a line of sight of a user's eyes with respect to the display;
  displaying, via the AR-device when it is determined based on the position data that a user is looking at the display, a virtual control interface for controlling by gestures at least one of the display and content displayed on the display;
  gesture data is acquired, describing at least one gesture performed by the user interacting with the virtual control interface displayed via the AR-device;
  control data is determined based on the position data and the gesture data, describing a user's command to control at least one of the display and the displayed content.

2. The method according to claim 1, wherein acquiring the position data involves determining
  spatial position of the display and the spatial position of the AR-device in a common co-ordinate system, particularly by means of a medical tracking system;
  the spatial position of the display in a co-ordinate system assigned to the AR-device.

3. The method according to claim 1, wherein acquiring the position data and/or acquiring the gesture data involves an analysis of images, particularly a shape- or pattern-recognition-procedure in images acquired from at least one video-camera.

4. The method according to claim 1, wherein the position data and/or the gesture data is acquired from at least one sensor of the AR-device, particularly wherein the AR-device comprises at least one of:
  a video-camera, particularly oriented towards a field of view provided by the AR-device;
  a video-camera oriented towards an eye of the user;
  an acceleration sensor for determining spatial orientation of the AR-device;
  a depth sensor for determining the distance of the AR-device to an object in the field of view provided by the AR-device.

5. The method according to claim 4, wherein the content displayed by the display is supplemented by content displayed by the AR-device, particularly supplemented in a positionally registered manner within the field of view provided by the AR-device.

6. The method according to claim 4, wherein the content displayed by the display is replaced by content displayed by the AR-device, particularly replaced in a positionally registered manner within the field of view provided by the AR-device.

7. The method according to claim 1, wherein a plurality of displays is controlled.

8. The method according to claim 1, wherein content displayed by a first display is transferred to a second display or, in a virtual manner, to another, invariant spatial position within a medical workspace defined by the user.

9. The method according to claim 7, wherein at least during the transfer-time, the displayed content is displayed by the AR-device.

10. The method according to claim 1, involving a plurality of AR-devices, wherein at least one of the plurality of AR-devices indicates where one or more users of the at least one other AR-devices is/are looking at.

11. The method of claim 1 further including providing the AR-device, particularly of AR-goggles, for controlling the display in the medical environment.

12. A non-transitory computer readable medium comprising instructions which when executed by at least one processor, cause the at least one processor to:
  acquire position data, describing a line of sight of an AR-device and/or a line of sight of a user's eyes with respect to a display;
  display, via the AR-device and if it is determined based on the position data that a user is looking at the display, a virtual control interface for controlling by gestures at least one of the display and content displayed on the display;
  acquire gesture data describing at least one gesture performed by the user interacting with the virtual control interface displayed via the AR-device;
  determine control data based on the position data and the gesture data, describing a user's command to control at least one of the display and the displayed content.

13. A medical system, comprising:
  at least one computer having at least one processor and associated memory, the memory storing instructions which when executed by the at least one processor causes the at least one processor to:
    acquire position data, describing a line of sight of an AR-device and/or a line of sight of a user's eyes with respect to a display;
    display, via the AR-device and if it is determined based on the position data that a user is looking at the display, a virtual control interface for controlling by gestures at least one of the display and content displayed on the display;
    acquire gesture data describing at least one gesture performed by the user interacting with the virtual control interface displayed via the AR-device;
    determine control data based on the position data and the gesture data, describing a user's command to control at least one of the display and the displayed content;
  at least one display for displaying medical content in a medical environment; and
  at least one AR-device comprising a tracking system for controlling the display,
  wherein the at least one computer is operably coupled to a medical tracking system for acquiring, from the medical tracking system, at least the position data and the gesture data, and the display for issuing a control signal to the display for controlling the operation of the display on the basis of the position data and the gesture data.

* * * * *